(12) United States Patent
Chen

(10) Patent No.: US 8,336,694 B2
(45) Date of Patent: Dec. 25, 2012

(54) BICYCLE HUB ASSEMBLY WITH QUICKLY SWITCHING FUNCTION

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 388 days.

(21) Appl. No.: 12/715,659

(22) Filed: Mar. 2, 2010

(65) Prior Publication Data
US 2011/0214961 A1  Sep. 8, 2011

(51) Int. Cl.
*F16D 41/26* (2006.01)
*F16D 41/30* (2006.01)
*B60B 27/06* (2006.01)

(52) U.S. Cl. .............. 192/64; 192/114 R; 301/110.5

(58) Field of Classification Search .......... 192/65, 192/46, 110 B; 310/110.5
See application file for complete search history.

(56) References Cited

U.S. PATENT DOCUMENTS

| 7,938,241 B1 * | 5/2011 | Chen ................... 192/64 |
| 2009/0230758 A1 * | 9/2009 | Schneider et al. ...... 301/110.5 |
| 2009/0243372 A1 * | 10/2009 | Hou et al. ............. 301/110.5 |
| 2011/0148183 A1 * | 6/2011 | Chen ..................... 301/110.5 |

* cited by examiner

*Primary Examiner* — Rodney Bonck
*Assistant Examiner* — Lillian Nguyen
(74) *Attorney, Agent, or Firm* — Alan Kamrath; Kamrath IP Lawfirm, PA

(57) ABSTRACT

A hub assembly includes a shaft, a hub mounted on the shaft and having a plurality of locking grooves, a driven ring mounted in the hub and having a plurality of oneway ratchet teeth, a drive seat rotatably mounted on the shaft, a drive ring mounted on the drive seat and received in the driven ring, a plurality of pawl members mounted on the drive ring and meshing with the oneway ratchet teeth, a sprocket secured on the drive seat, and a control ring slidably mounted on the drive seat and having a plurality of locking blocks releasably locked in the locking grooves. Thus, a user only needs to move the control ring to switch the operation modes of the bicycle between a normal riding and an acrobatic performance so that the user can change the two operation modes easily and quickly.

8 Claims, 8 Drawing Sheets

BICYCLE HUB ASSEMBLY WITH QUICKLY SWITCHING FUNCTION

BACKGROUND OF THE INVENTION

1. Field of the Invention

The present invention relates to a hub assembly and, more particularly, to a hub assembly for a bicycle.

2. Description of the Related Art

A conventional hub assembly for a bicycle in accordance with the prior art shown in FIG. 8 comprises a shaft 54, a hub 50 rotatably mounted on the shaft 54, a mounting sleeve 52 secured on a first end of the hub 50, a first sprocket 55 mounted on the mounting sleeve 52 and having an inner wall provided with a plurality of oneway ratchet teeth 551, a plurality of pawl members 53 pivotally mounted on the mounting sleeve 52 and meshing with the oneway ratchet teeth 551 of the first sprocket 55, and a second sprocket 51 secured on a second end of the hub 50.

In assembly, the hub 50 is connected to a wheel (not shown) of the bicycle, the shaft 54 is connected to the rear stays (not shown) of a frame (not shown) of the bicycle, and the first sprocket 55 meshes with and is driven by a chain (not shown) which is driven by a chainwheel (not shown) which is driven by a pedal (not shown) that is pedalled by a rider. In operation, when the pedal is pedalled by the rider, the chainwheel is driven by the pedal to drive the chain which drives the first sprocket 55 to rotate forward. At this time, the pawl members 53 on the mounting sleeve 52 mesh with the oneway ratchet teeth 551 of the first sprocket 55 so that when the first sprocket 55 is rotated forward, the mounting sleeve 52 is also rotated forward to rotate the hub 50 forward so as to move the wheel forward. On the contrary, when the pedal is pedalled by the rider to move backward, the chainwheel is driven by the pedal to drive the chain which drives the first sprocket 55 to rotate backward. At this time, the pawl members 53 on the mounting sleeve 52 disengage the oneway ratchet teeth 551 of the first sprocket 55 so that when the first sprocket 55 is rotated backward, the mounting sleeve 52 together with the hub 50 is not rotated by the first sprocket 55, and the first sprocket 55 idles. Thus, when the first sprocket 55 is rotated forward (in the positive direction) relative to the shaft 54, the hub 50 is also rotated forward relative to the shaft 54 so as to move the wheel forward, while when the first sprocket 55 is rotated backward (in the reverse direction) relative to the shaft 54, the hub 50 is not driven by the first sprocket 55, and the first sprocket 55 idles. In such a manner, the bicycle is used for a normal riding.

Alternatively, the hub 50 and the wheel are turned around so that the second sprocket 51 meshes with and is driven by the chain. In operation, when the pedal is pedalled by the rider, the chainwheel is driven by the pedal to drive the chain which drives the second sprocket 51 to rotate forward so that the hub 50 is also driven by the second sprocket 51 to rotate forward. On the contrary, when the pedal is pedalled by the rider to move backward, the chainwheel is driven by the pedal to drive the chain which drives the second sprocket 51 to rotate backward so that the hub 50 is also driven by the second sprocket 51 to rotate backward. Thus, when the second sprocket 51 is rotated forward (in the positive direction) relative to the shaft 54, the hub 50 is also rotated forward relative to the shaft 54 so as to move the wheel forward, while when the second sprocket 51 is rotated backward (in the reverse direction) relative to the shaft 54, the hub 50 is also rotated backward relative to the shaft 54 so as to move the wheel backward. In such a manner, the bicycle is used for an acrobatic performance.

However, the user has to turn around the hub 50 and the wheel to switch the operation modes of the bicycle between a normal riding and an acrobatic performance so that the user cannot change the two operation modes of the bicycle easily and quickly, thereby causing inconvenience to the user when changing the two operation modes of the bicycle.

BRIEF SUMMARY OF THE INVENTION

In accordance with the present invention, there is provided a hub assembly for a bicycle, comprising a shaft, a hub rotatably mounted on the shaft and having an inner wall provided with a plurality of locking grooves, a driven ring mounted in the hub to rotate the hub relative to the shaft and having an inner wall provided with a plurality of oneway ratchet teeth, a drive seat rotatably mounted on the shaft, a drive ring mounted on a first end of the drive seat to rotate in concert with the drive seat and received in the driven ring, a plurality of pawl members pivotally mounted on the drive ring and releasably meshing with the oneway ratchet teeth of the driven ring so that the driven ring is driven by the drive ring, at least one sprocket secured on a second end of the drive seat to rotate the drive seat and the drive ring relative to the driven ring, and a control ring slidably mounted on the drive seat to rotate in concert with the drive seat and having a side provided with a plurality of locking blocks which are insertable into and releasably locked in the locking grooves of the hub respectively so that the control ring is detachably combined with the hub to rotate the hub relative to the shaft.

The hub has a side provided with a receiving space connected to the locking grooves and the driven ring. The drive seat and the drive ring are received in the receiving space of the hub. The drive seat has a peripheral wall provided with a plurality of axially extending slideways. The control ring is received in the receiving space of the hub. The control ring has an inner wall provided with a plurality of radially and inwardly extending sliding blocks slidable in the slideways of the drive seat respectively.

The primary objective of the present invention is to provide a bicycle hub assembly with a quickly switching function.

According to the primary objective of the present invention, the control ring is movable relative to the hub between a first position where the control ring is detached from the hub so that the hub is driven by the pawl members of the drive ring to rotate in one direction only, and the bicycle is used for a normal riding and a second position where the control ring is combined with the hub so that the hub is directly driven by the control ring to rotate in two opposite directions, and the bicycle is used for an acrobatic performance.

According to another objective of the present invention, a user only needs to move the control ring to switch the operation modes of the bicycle between a normal riding and an acrobatic performance so that the user can change the two operation modes of the bicycle easily and quickly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
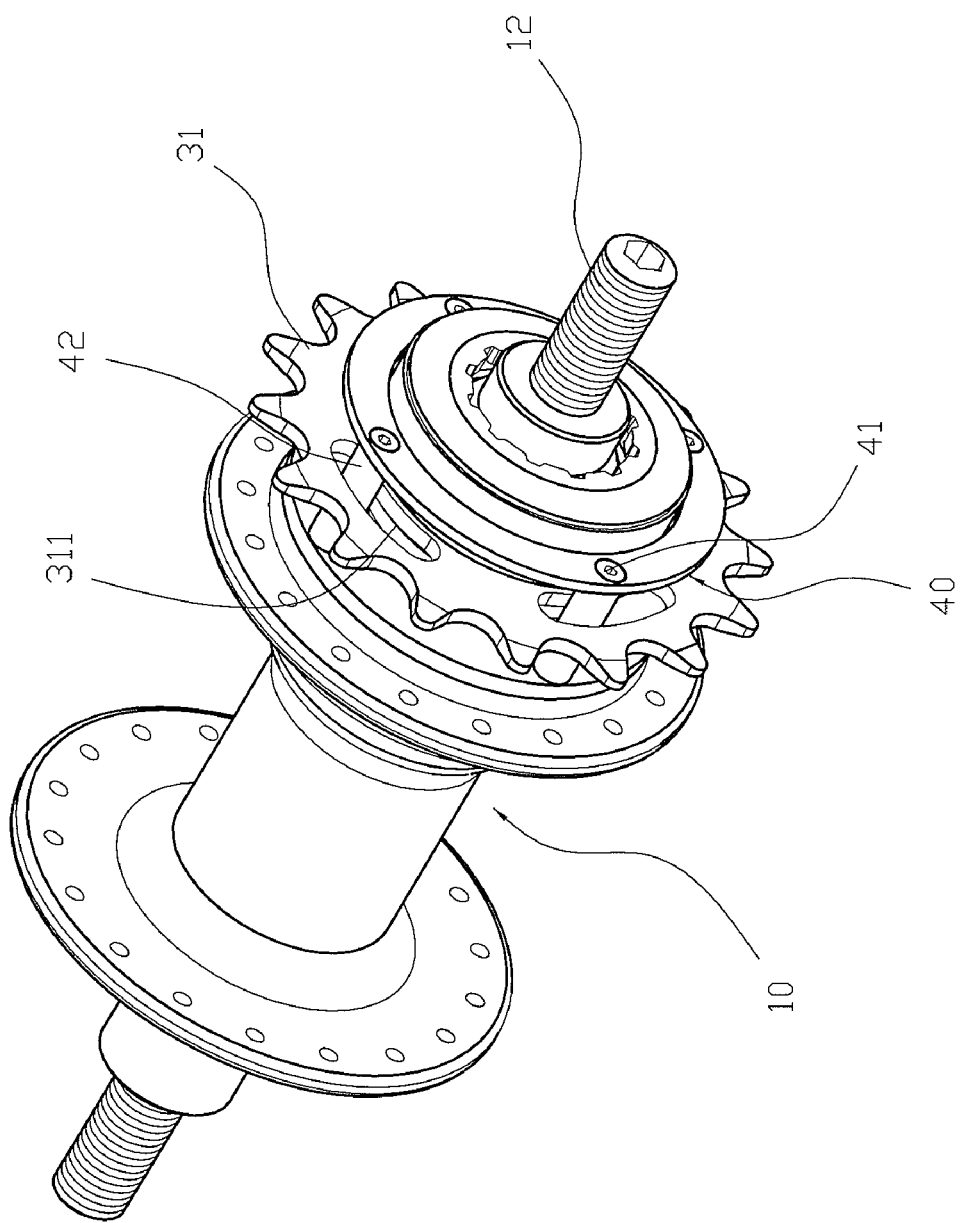
FIG. 1 is a perspective view of a hub assembly for a bicycle in accordance with the preferred embodiment of the present invention.
Figure 2:
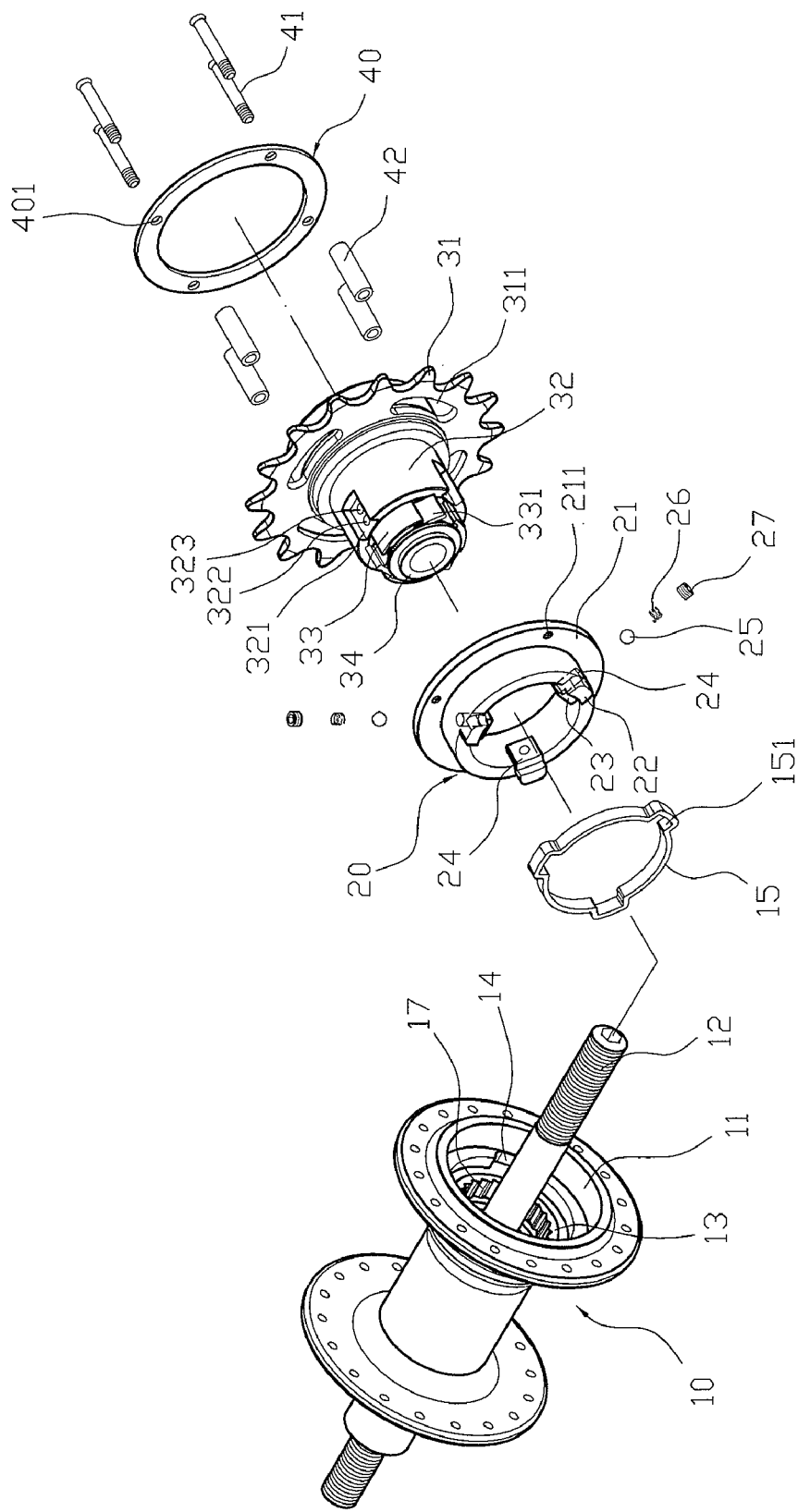
FIG. 2 is an exploded perspective view of the hub assembly for a bicycle as shown in FIG. 1.
Figure 3:
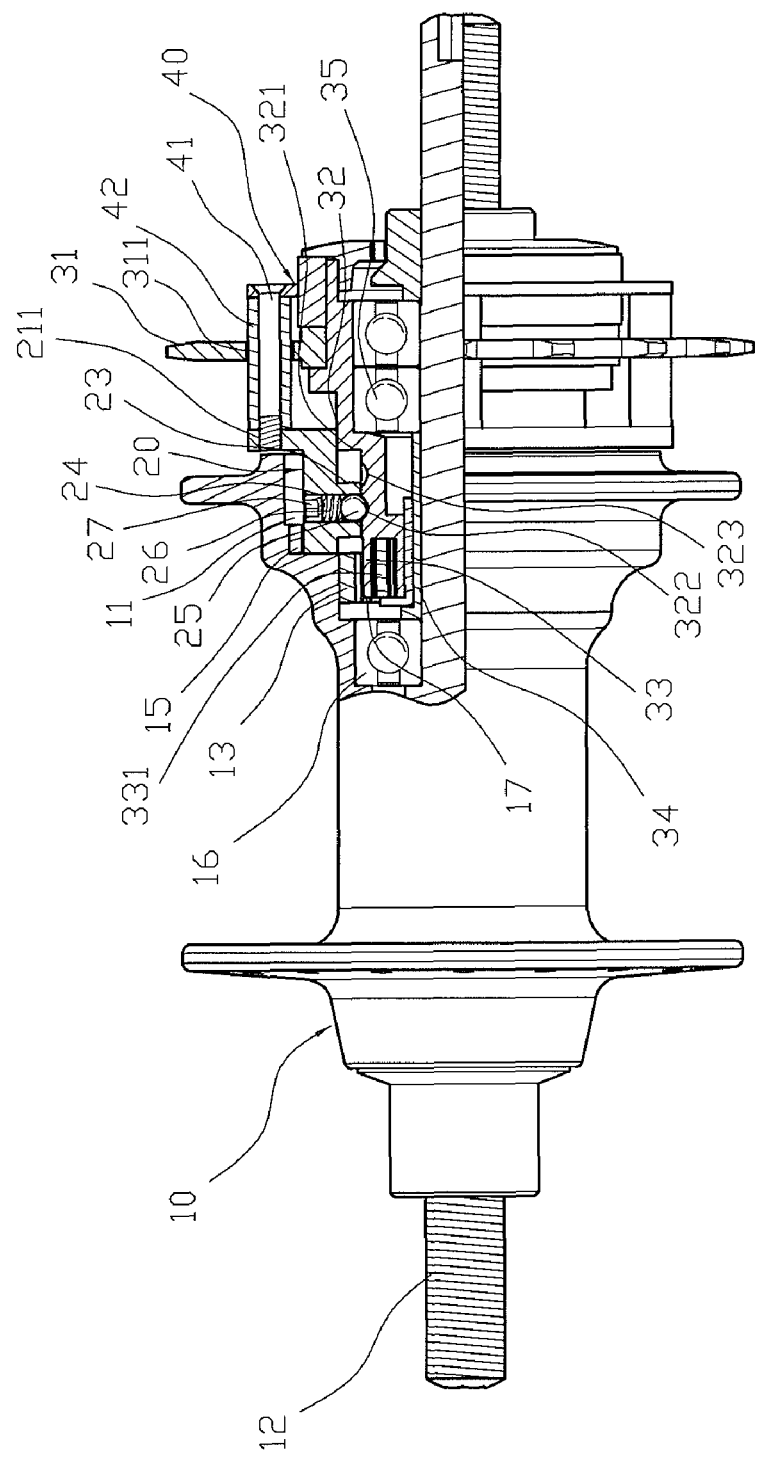
FIG. 3 is a partially front cross-sectional view of the hub assembly for a bicycle as shown in FIG. 1.

Referring to the drawings and initially to FIGS. 1-3, a hub assembly for a bicycle in accordance with the preferred embodiment of the present invention comprises a shaft 12, a hub 10 rotatably mounted on the shaft 12 and having an inner wall provided with a plurality of locking grooves 14, a driven ring 13 mounted in the hub 10 to rotate the hub 10 relative to the shaft 12 and having an inner wall provided with a plurality of oneway ratchet teeth 17, a drive seat 32 rotatably mounted on the shaft 12, a drive ring 33 mounted on a first end of the drive seat 32 to rotate in concert with the drive seat 32 and received in the driven ring 13, a plurality of pawl members 331 pivotally mounted on the drive ring 33 and releasably meshing with the oneway ratchet teeth 17 of the driven ring 13 so that the driven ring 13 is driven by the drive ring 33, at least one sprocket 31 secured on a second end of the drive seat 32 to rotate the drive seat 32 and the drive ring 33 relative to the driven ring 13, a control ring 20 slidably mounted on the drive seat 32 to rotate in concert with the drive seat 32 and having a side provided with a plurality of locking blocks 22 which are insertable into and releasably locked in the locking grooves 14 of the hub 10 respectively so that the control ring 20 is detachably combined with the hub 10 to rotate the hub 10 relative to the shaft 12, a driving plate 40 connected with the control ring 20 to move the control ring 20 relative to the hub 10 and the drive seat 32, a plurality of spacing tubes 42 mounted between the control ring 20 and the driving plate 40 to separate the control ring 20 from the driving plate 40, and a wear-resistant ring 15 mounted between the control ring 20 and the hub 10.

The hub 10 has a side provided with a receiving space 11 connected to the locking grooves 14 and the driven ring 13. The locking grooves 14 of the hub 10 are located between the receiving space 11 of the hub 10 and the driven ring 13 and are arranged in an annular manner.

The drive seat 32 and the drive ring 33 are received in the receiving space 11 of the hub 10. The drive seat 32 has a peripheral wall provided with a plurality of axially extending slideways 321. Each of the slideways 321 of the drive seat 32 has a surface provided with a first positioning hole 322 and a second positioning hole 323.

The control ring 20 is received in the receiving space 11 of the hub 10. The control ring 20 has an outer wall provided with an enlarged annular mounting flange 21 extending radially and outwardly. The mounting flange 21 of the control ring 20 has a peripheral wall provided with a plurality of screw bores 211. The control ring 20 has an inner wall provided with a plurality of radially and inwardly extending sliding blocks 23 slidable in the slideways 321 of the drive seat 32 respectively. Each of the sliding blocks 23 of the control ring 20 has a surface provided with a receiving hole 24 to receive a positioning ball 25, an elastic member 26 and an adjusting screw 27. The elastic member 26 of each of the sliding blocks 23 is biased between the positioning ball 25 and the adjusting screw 27 to push the positioning ball 25 toward the respective slideway 321 of the drive seat 32. The positioning ball 25 of each of the sliding blocks 23 is movable between the first positioning hole 322 and the second positioning hole 323 of the respective slideway 321 and is detachably positioned in one of the first positioning hole 322 and the second positioning hole 323 of the respective slideway 321.

Figure 4:
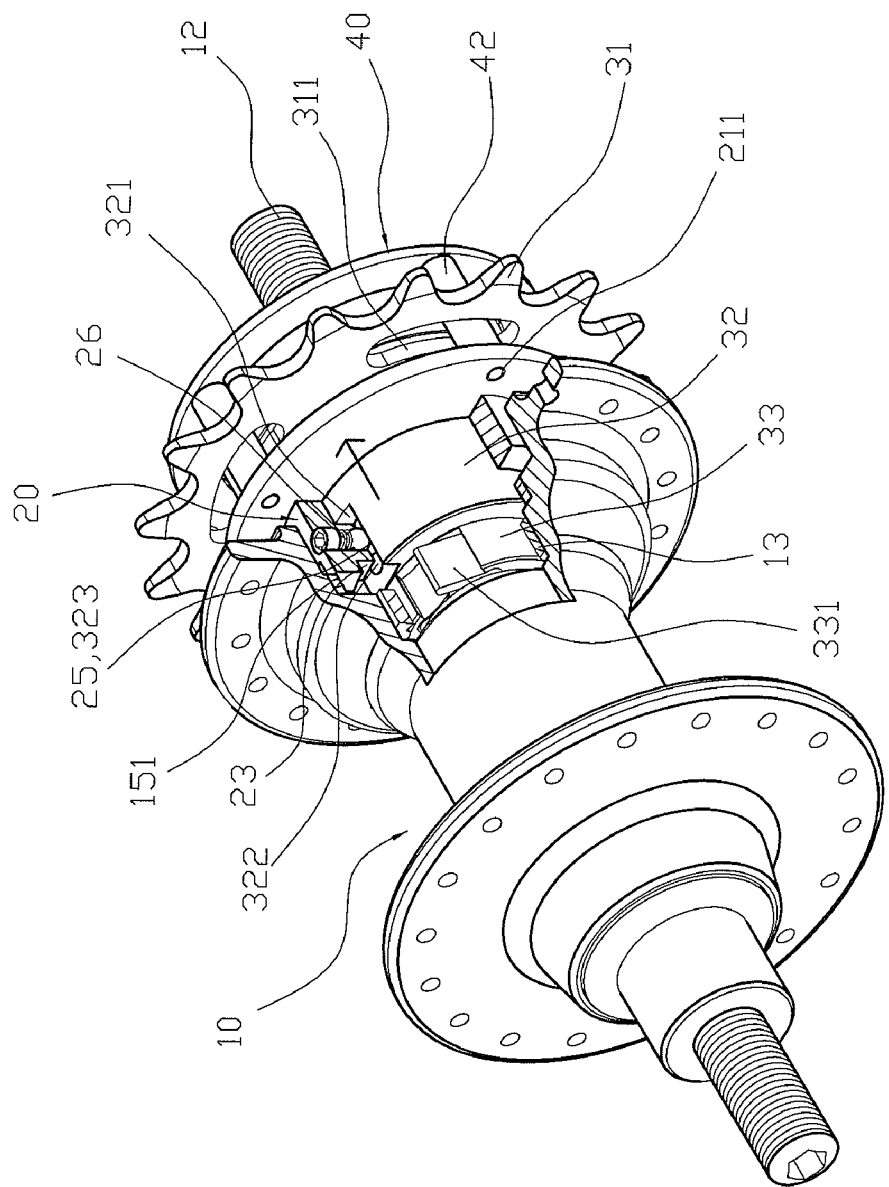
FIG. 4 is a partially perspective cross-sectional operational view of the hub assembly for a bicycle as shown in FIG. 1.
Figure 5:
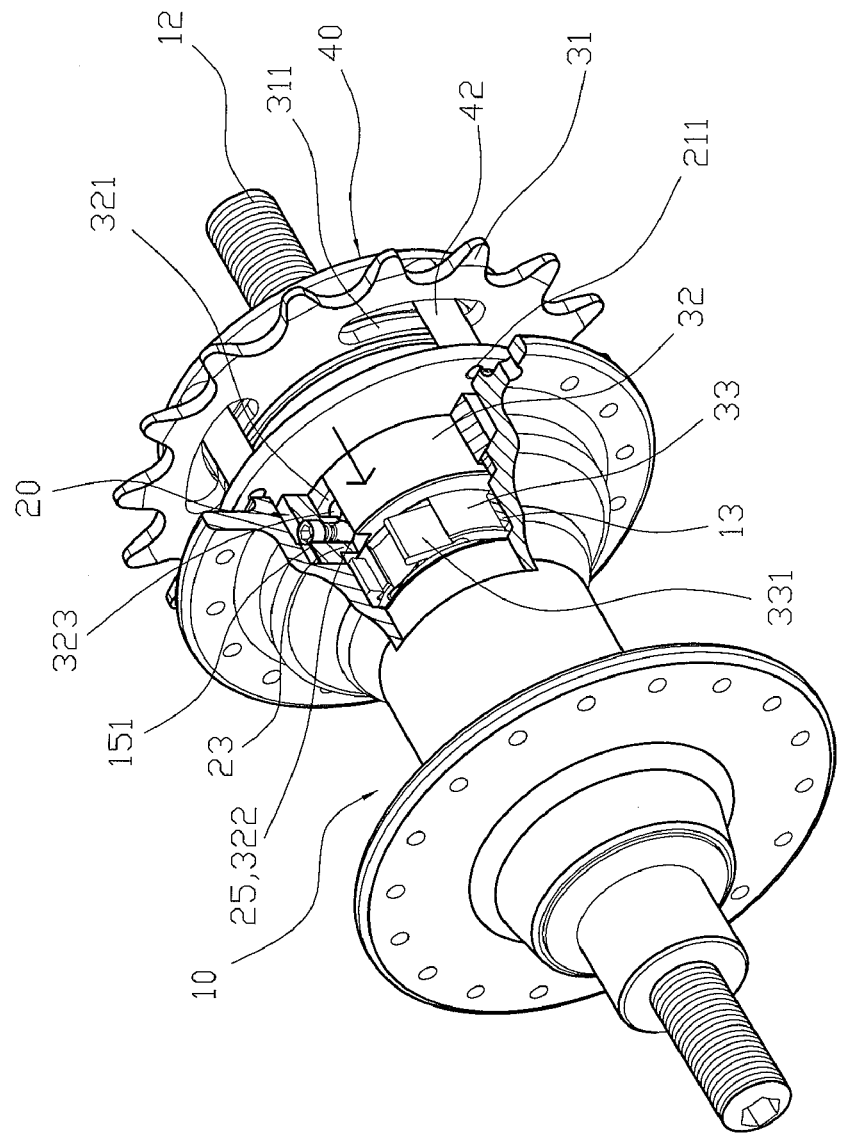
FIG. 5 is a partially perspective cross-sectional operational view of the hub assembly for a bicycle as shown in FIG. 1.

Thus, when the positioning ball 25 of each of the sliding blocks 23 is positioned in the first positioning hole 322 of the respective slideway 321 as shown in FIG. 5, the locking blocks 22 of the control ring 20 are locked in the locking grooves 14 of the hub 10 respectively so that the control ring 20 is combined with the hub 10, and when the positioning ball 25 of each of the sliding blocks 23 is positioned in the second positioning hole 323 of the respective slideway 321 as shown in FIG. 4, the locking blocks 22 of the control ring 20 are detached from the locking grooves 14 of the hub 10 respectively so that the control ring 20 is detached from the hub 10.

The wear-resistant ring 15 is made of a wear-resistant metal to protect the locking grooves 14 of the hub 10. The wear-resistant ring 15 has a peripheral wall provided with a plurality of recessed locking lugs 151 secured in the locking grooves 14 of the hub 10 respectively, and the locking blocks 22 of the control ring 20 are inserted into and detachably locked in the locking lugs 151 of the wear-resistant ring 15 respectively.

The sprocket 31 is disposed between the control ring 20 and the driving plate 40. The sprocket 31 has a peripheral wall provided with a plurality of elongate passage 311. The driving plate 40 is connected with the control ring 20 by a plurality of fastening bolts 41. The driving plate 40 has an annular shape and has a peripheral wall provided with a plurality of fixing holes 401. The fastening bolts 41 in turn extend through the fixing holes 401 of the driving plate 40, the spacing tubes 42 and the passage 311 of the sprocket 31 respectively and are screwed into the screw bores 211 of the mounting flange 21. The spacing tubes 42 are mounted on the fastening bolts 41 respectively and extend through the passage 311 of the sprocket 31 respectively.

In the preferred embodiment of the present invention, the hub assembly comprises a plurality of sprockets 31 secured on the drive seat 32 respectively. In addition, the number of the slideways 321 of the drive seat 32 is equal to that of the sliding blocks 23 of the control ring 20, and the number of the locking blocks 22 of the control ring 20 is equal to that of the locking grooves 14 of the hub 10.

The hub assembly further comprises a bushing 34 mounted between the drive ring 33 and the shaft 12. The hub 10 is rotatably mounted on the shaft 12 by a first bearing 16, the drive seat 32 is rotatably mounted on the shaft 12 by at least one second bearing 35, and the bushing 34 is located between first bearing 16 and the second bearing 35 to control the distance between the hub 10 and the drive seat 32.

In assembly, the hub 10 is connected to a wheel (not shown) of the bicycle, the shaft 12 is connected to the rear stays (not shown) of a frame (not shown) of the bicycle, and the sprocket 31 on the drive seat 32 meshes with and is driven by a chain (not shown) which is driven by a chainwheel (not shown) which is driven by a pedal (not shown) that is pedalled by a rider.

In operation, referring to FIG. 4 with reference to FIGS. 1-3, when the bicycle is used for a normal riding, the control ring 20 is pulled by the driving plate 40 to move outwardly relative to the hub 10 so that the locking blocks 22 of the control ring 20 are detached from the locking grooves 14 of the hub 10 respectively, and the control ring 20 is detached from the hub 10. At this time, the positioning ball 25 of each of the sliding blocks 23 is positioned in the second positioning hole 323 of the respective slideway 321 as shown in FIG. 4.

Thus, when the pedal is pedalled by the rider, the chainwheel is driven by the pedal to drive the chain which drives the sprocket 31 so as to rotate the drive seat 32 forward, so that the drive seat 32 is rotated forward relative to the shaft 12, and the drive ring 33 is also rotated forward relative to the shaft 12. At this time, each of the pawl members 331 meshes with the oneway ratchet teeth 17 of the driven ring 13 when the drive seat 32 is rotated forward so that the driven ring 13 is combined with the drive ring 33 by the pawl members 331. In such a manner, when the drive seat 32 is rotated forward (in the positive direction) relative to the shaft 12, the driven ring 13 is driven by the drive seat 32 to drive and rotate the hub 10 forward relative to the shaft 12 so as to move the wheel forward.

On the contrary, when the pedal is pedalled by the rider to move backward, the chainwheel is driven by the pedal to drive the chain which drives the sprocket 31 so as to rotate the drive seat 32 backward relative to the shaft 12, so that the drive seat 32 is rotated backward relative to the shaft 12, and the drive ring 33 is also rotated backward relative to the shaft 12. At this time, each of the pawl members 331 disengages the oneway ratchet teeth 17 of the driven ring 13 when the drive seat 32 is rotated backward so that the driven ring 13 is detached from the drive ring 33. In such a manner, when the drive seat 32 is rotated backward (in the reverse direction) relative to the shaft 12, the driven ring 13 together with the hub 10 is not driven by the drive seat 32, and the drive seat 32 idles.

Thus, when the drive seat 32 is rotated forward (in the positive direction) relative to the shaft 12, the hub 10 is also rotated forward relative to the shaft 12 so as to move the wheel forward, while when the drive seat 32 is rotated backward (in the reverse direction) relative to the shaft 12, the hub 10 is not driven by the drive seat 32, and the drive seat 32 idles. In such a manner, the bicycle is used for a normal riding.

Alternatively, referring to FIG. 5 with reference to FIGS. 1-3, when the bicycle is used for an acrobatic performance, the control ring 20 is pushed by the driving plate 40 to move toward the hub 10 so that the locking blocks 22 of the control ring 20 are locked in the locking grooves 14 of the hub 10 respectively, and the control ring 20 is combined with the hub 10. At this time, the positioning ball 25 of each of the sliding blocks 23 is positioned in the first positioning hole 322 of the respective slideway 321 as shown in FIG. 5.

Thus, when the drive seat 32 is rotated forward (in the positive direction) relative to the shaft 12, the control ring 20 is also rotated forward relative to the shaft 12 so that the hub 10 is also rotated forward relative to the shaft 12 so as to move the wheel forward, while when the drive seat 32 is rotated backward (in the reverse direction) relative to the shaft 12, the control ring 20 is also rotated backward relative to the shaft 12 so that the hub 10 is also rotated backward relative to the shaft 12 so as to move the wheel backward. In such a manner, the bicycle is used for an acrobatic performance.

Figure 6:
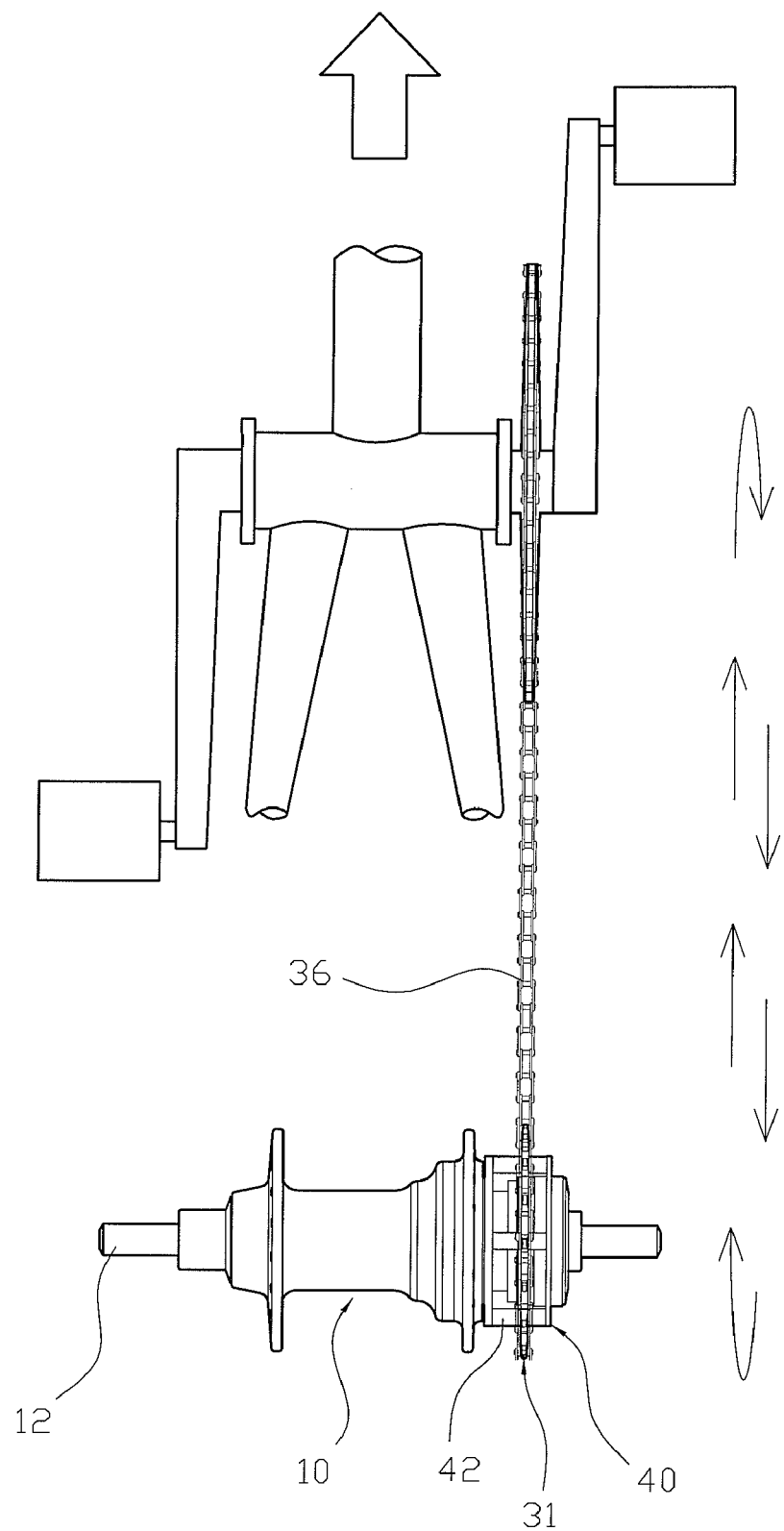
FIG. 6 is a schematic top operational view of the hub assembly for a bicycle as shown in FIG. 1.

Referring to FIG. 6, the sprocket 31 meshes with a chain 36 which is mounted on the right side of the hub 10.

Figure 7:
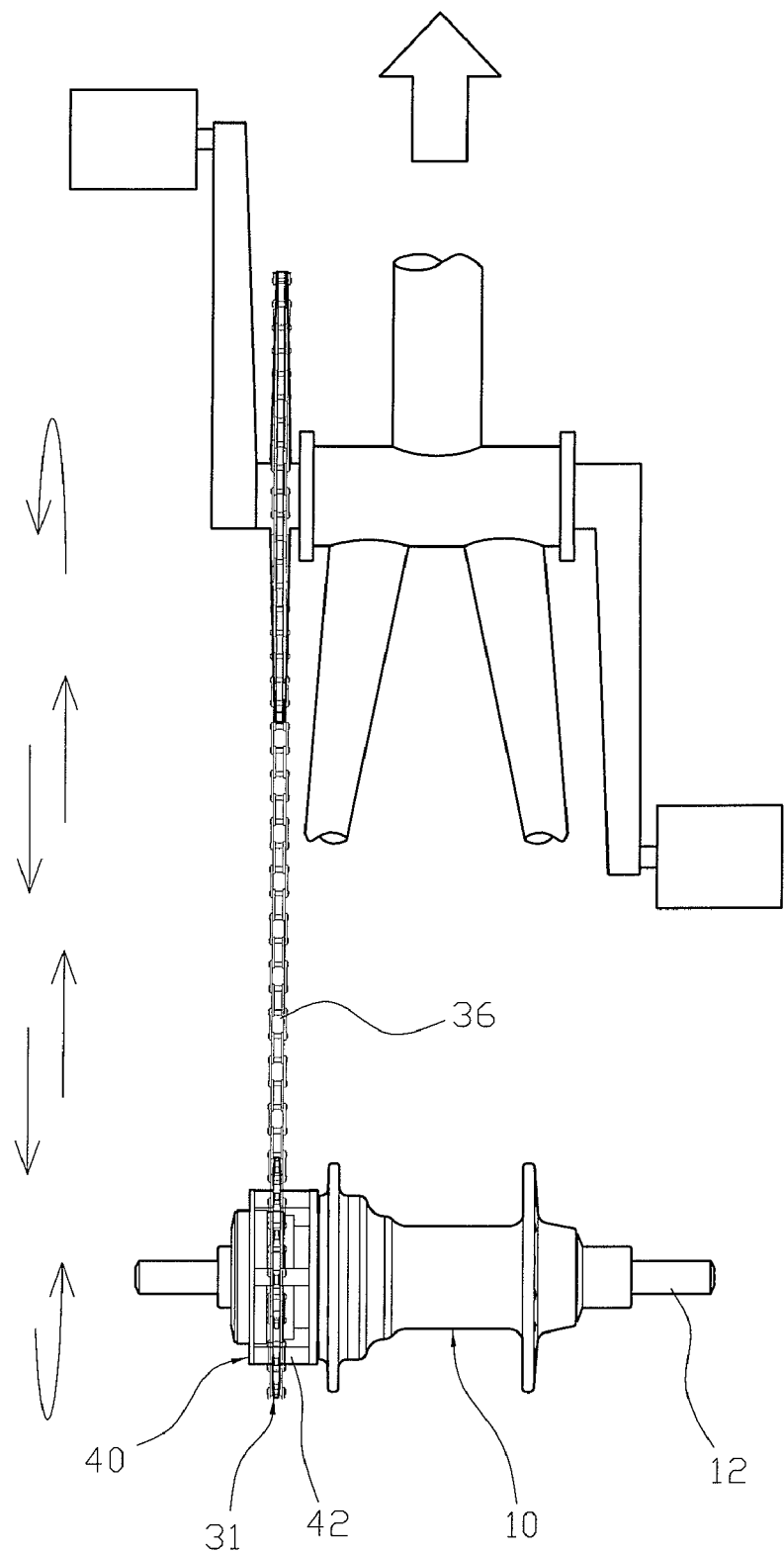
FIG. 7 is a schematic top operational view of the hub assembly for a bicycle as shown in FIG. 1.
Figure 8:
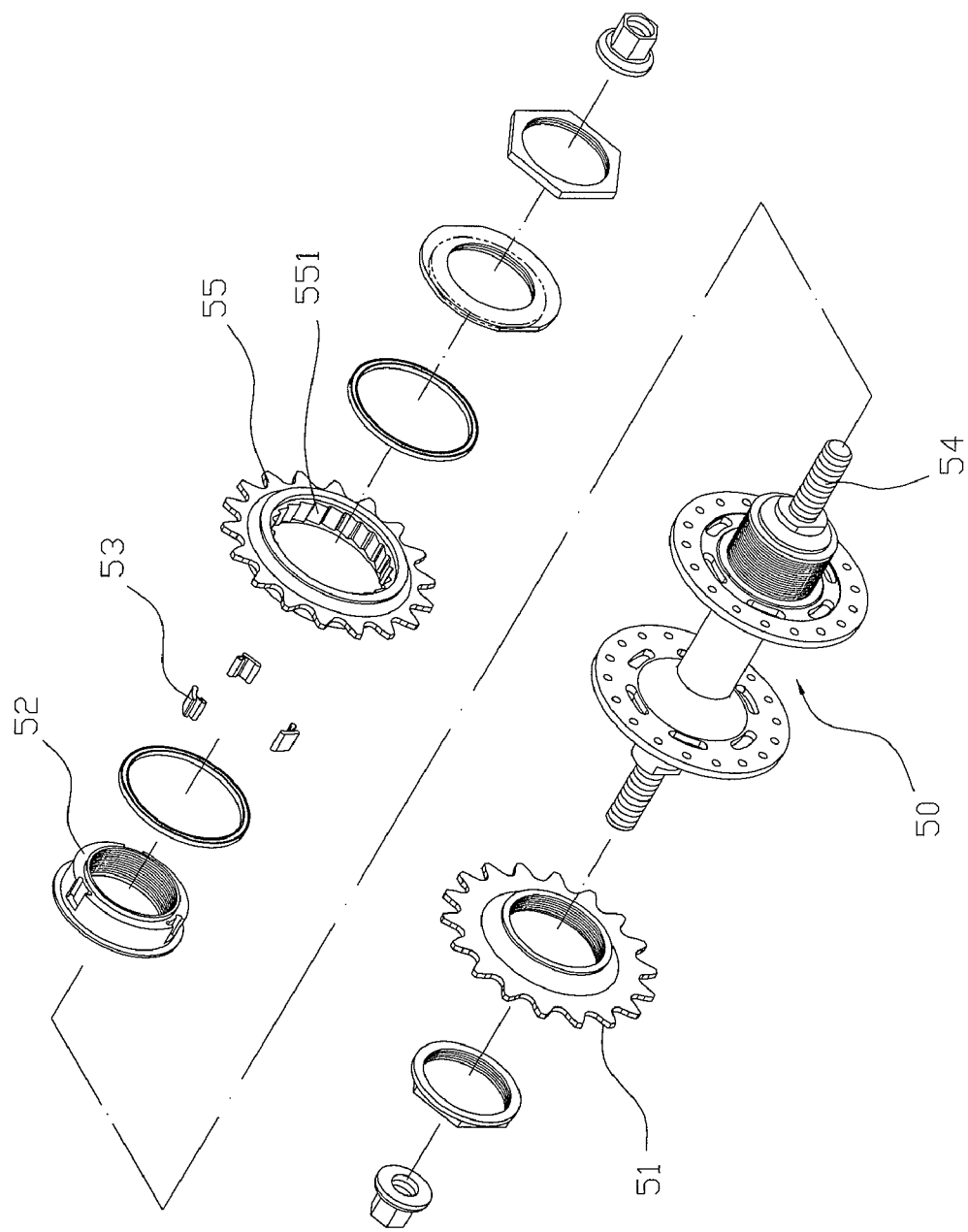
FIG. 8 is an exploded perspective view of a conventional hub assembly for a bicycle in accordance with the prior art.

Referring to FIG. 7, the sprocket 31 meshes with a chain 36 which is mounted on the right side of the hub 10.

Accordingly, the control ring 20 is movable relative to the hub 10 between a first position as shown in FIG. 4 where the control ring 20 is detached from the hub 10 so that the hub 10 is driven by the pawl members 331 of the drive ring 33 to rotate in one direction only, and the bicycle is used for a normal riding and a second position as shown in FIG. 5 where the control ring 20 is combined with the hub 10 so that the hub 10 is directly driven by the control ring 20 to rotate in two opposite directions, and the bicycle is used for an acrobatic performance. In addition, a user only needs to move the control ring 20 to switch the operation modes of the bicycle between a normal riding and an acrobatic performance so that the user can change the two operation modes of the bicycle easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub assembly for a bicycle, comprising:
a shaft;
a hub rotatably mounted on the shaft and having an inner wall provided with a plurality of locking grooves;
a driven ring mounted in the hub to rotate the hub relative to the shaft and having an inner wall provided with a plurality of oneway ratchet teeth;
a drive seat rotatably mounted on the shaft;
a drive ring mounted on a first end of the drive seat to rotate in concert with the drive seat and received in the driven ring;
a plurality of pawl members pivotally mounted on the drive ring and releasably meshing with the oneway ratchet teeth of the driven ring so that the driven ring is driven by the drive ring;
at least one sprocket secured on a second end of the drive seat to rotate the drive seat and the drive ring relative to the driven ring;
a control ring slidably mounted on the drive seat to rotate in concert with the drive seat and having a side provided with a plurality of locking blocks which are insertable into and releasably locked in the locking grooves of the hub respectively so that the control ring is detachably combined with the hub to rotate the hub relative to the shaft;
wherein the hub has a side provided with a receiving space connected to the locking grooves and the driven ring;
the drive seat and the drive ring are received in the receiving space of the hub;
the drive seat has a peripheral wall provided with a plurality of axially extending slideways;
the control ring is received in the receiving space of the hub;
the control ring has an inner wall provided with a plurality of radially and inwardly extending sliding blocks slidable in the slideways of the drive seat respectively.

2. The hub assembly for a bicycle of claim 1, wherein
the hub assembly further comprises a wear-resistant ring mounted between the control ring and the hub;
the wear-resistant ring is made of a wear-resistant metal to protect the locking grooves of the hub;
the wear-resistant ring has a peripheral wall provided with a plurality of recessed locking lugs secured in the locking grooves of the hub respectively;
the locking blocks of the control ring are inserted into and detachably locked in the locking lugs of the wear-resistant ring respectively.

3. The hub assembly for a bicycle of claim 1, wherein the hub assembly comprises a plurality of sprockets secured on the drive seat respectively.

4. The hub assembly for a bicycle of claim 1, wherein
the number of the slideways of the drive seat is equal to that of the sliding blocks of the control ring;
the number of the locking blocks of the control ring is equal to that of the locking grooves of the hub;
the locking grooves of the hub are located between the receiving space of the hub and the driven ring;
the locking grooves of the hub are arranged in an annular manner.

5. The hub assembly for a bicycle of claim 1, wherein
the hub assembly further comprises a bushing mounted between the drive ring and the shaft;
the hub is rotatably mounted on the shaft by a first bearing;
the drive seat is rotatably mounted on the shaft by at least one second bearing;
the bushing is located between first bearing and the second bearing to control a distance between the hub and the drive seat.

6. The hub assembly for a bicycle of claim 1, wherein
each of the slideways of the drive seat has a surface provided with a first positioning hole and a second positioning hole;
each of the sliding blocks of the control ring has a surface provided with a receiving hole to receive a positioning ball, an elastic member and an adjusting screw;
the elastic member of each of the sliding blocks is biased between the positioning ball and the adjusting screw to push the positioning ball toward the respective slideway of the drive seat;
the positioning ball of each of the sliding blocks is movable between the first positioning hole and the second positioning hole of the respective slideway and is detachably positioned in one of the first positioning hole and the second positioning hole of the respective slideway;
when the positioning ball of each of the sliding blocks is positioned in the first positioning hole of the respective slideway, the locking blocks of the control ring are locked in the locking grooves of the hub respectively so that the control ring is combined with the hub;
when the positioning ball of each of the sliding blocks is positioned in the second positioning hole of the respective slideway, the locking blocks of the control ring are detached from the locking grooves of the hub respectively so that the control ring is detached from the hub.

7. The hub assembly for a bicycle of claim 1, wherein
the hub assembly further comprises a driving plate connected with the control ring to move the control ring relative to the hub and the drive seat;
the driving plate is connected with the control ring by a plurality of fastening bolts.

8. The hub assembly for a bicycle of claim 7, wherein
the hub assembly further comprises a plurality of spacing tubes mounted between the control ring and the driving plate to separate the control ring from the driving plate;
the driving plate has a peripheral wall provided with a plurality of fixing holes;
the control ring has an outer wall provided with an enlarged annular mounting flange extending radially and outwardly;
the mounting flange of the control ring has a peripheral wall provided with a plurality of screw bores;
the sprocket is disposed between the control ring and the driving plate;
the sprocket has a peripheral wall provided with a plurality of elongate passage;
the fastening bolts in turn extend through the fixing holes of the driving plate, the spacing tubes and the passage of the sprocket respectively and are screwed into the screw bores of the mounting flange;
the spacing tubes are mounted on the fastening bolts respectively and extend through the passage of the sprocket respectively.

* * * * *